V. OLSON.
AUTOMATIC HEADLIGHT DIMMER FOR AUTOMOBILES.
APPLICATION FILED MAR. 24, 1917.
1,256,362.
Patented Feb. 12, 1918.
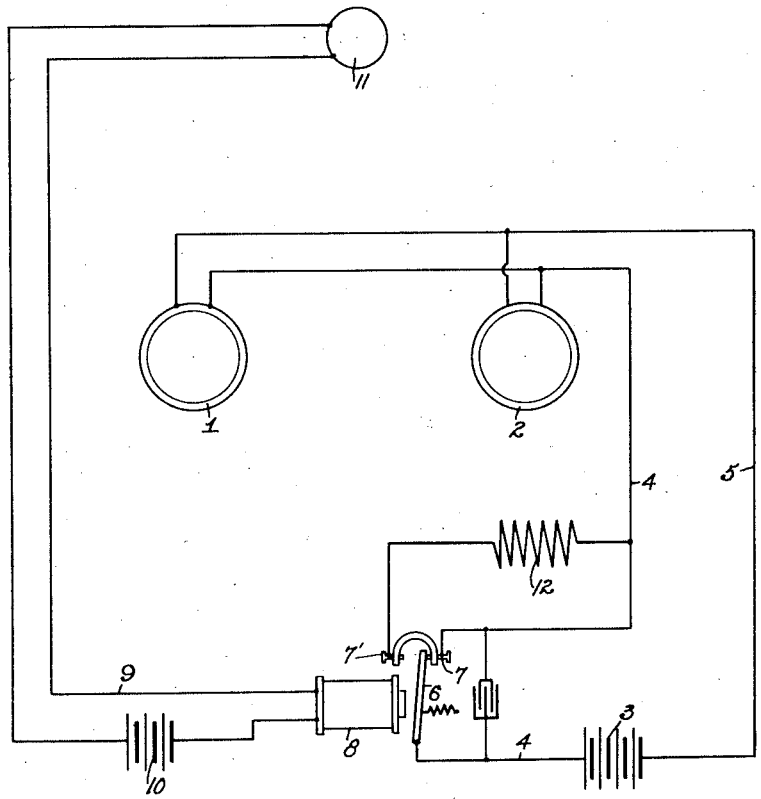
WITNESSES
INVENTOR
Victor Olson
BY
ATTORNEYS

UNITED STATES PATENT OFFICE.

VICTOR OLSON, OF NAUGATUCK, CONNECTICUT.

AUTOMATIC HEADLIGHT-DIMMER FOR AUTOMOBILES.

1,256,362.  Specification of Letters Patent.  Patented Feb. 12, 1918.

Application filed March 24, 1917. Serial No. 157,097.

*To all whom it may concern:*

Be it known that I, VICTOR OLSON, a citizen of the United States, and a resident of Naugatuck, in the county of New Haven and State of Connecticut, have invented a new and Improved Automatic Headlight-Dimmer for Automobiles, of which the following is a full, clear, and exact description.

This invention relates to headlight systems for automobiles, and deals particularly with means for automatically dimming the headlights so that they will not have a blinding effect on the occupants of a car coming in the opposite direction.

The invention has for its general objects to provide a headlight system of the character referred to which is of comparatively simple and inexpensive construction, reliable and efficient in use, and so designed that the headlights of a car will be automatically dimmed and kept in this condition until the cars pass, when the headlights will automatically brighten again.

With such objects in view, and others which will appear as the description proceeds, the invention comprises various novel features of construction and arrangement of parts which will be set forth with particularity in the following description and claims appended hereto.

In the accompanying drawing, the figure is a diagrammatic view of a headlight system illustrating the invention.

Referring to the drawing, 1 and 2 designate the headlights which are connected with a source of current 3 by wires 4 and 5, there being included in the wire 4 a switch composed of a movable contact 6 and a fixed contact 7. The movable contact is the armature of a relay or magnet 8 which is connected in a circuit 9 that includes a source of current 10 and a selenium cell 11. A movable contact 6 of the switch is adapted to move into engagement with another contact 7' when the magnet 8 is energized, and thereby a resistance 12 is connected in the headlight circuit, so that the flow of current will be reduced to such an extent as to considerably dim the headlights. The selenium cell will be so positioned on an automobile that the rays from the headlights of another automobile approaching from in front will cause the resistance of the relay circuit to be diminished to such an extent that the relay will become energized and the resistance 12 will be cut into circuit. As soon as the rays of light acting on the selenium cell are non-effective the circuit automatically returns to normal condition and the resistance 12 will be cut out.

From the foregoing description taken in connection with the accompanying drawing, the advantages of the construction and method of operation will be readily understood by those skilled in the art to which the invention appertains, and while I have described the principle of operation, together with the system which I now consider to be the best embodiment thereof, I desire to have it understood that the system shown is merely illustrative and that such changes may be made when desired as fall within the scope of the appended claims.

Having thus described my invention, I claim as new and desire to secure by Letters Patent:

1. The combination of a vehicle headlight system including a headlight, a source of current, and means for introducing a resistance into the circuit of the headlights to reduce the current flow, said means including a selenium cell exposed to the rays of light from the headlights of another automobile.

2. A vehicle headlight system including a headlight, a circuit therefor, a source of current in the circuit, a resistance, a switch for closing the circuit through the resistance or independently thereof, and means for operating the switch, said means including a selenium cell responsive to the rays of light from the headlight of another vehicle.

VICTOR OLSON.